United States Patent [19]

Alcalay et al.

[11] Patent Number: 5,704,186
[45] Date of Patent: Jan. 6, 1998

[54] CONSTRUCTION ELEMENT

[75] Inventors: Ran Alcalay, Tel-Aviv; Tomer Ganelevin, Shchania, both of Israel

[73] Assignee: Tiltan 3 Dimensional Technologies Ltd., Tel-Aviv, Israel

[21] Appl. No.: 590,191

[22] Filed: Jan. 23, 1996

[30] Foreign Application Priority Data

Jan. 24, 1995 [IL] Israel .......................... 112421

[51] Int. Cl.$^6$ .................................................. A63H 33/08
[52] U.S. Cl. .......................... 52/726.1; 403/188; 403/190; 403/217; 403/354; 403/359; 403/375; 446/120; 446/121; 446/124; 446/125; 446/128
[58] Field of Search ............... 52/726.1; 446/120, 446/106, 121, 122, 124, 125, 128; 403/173, 188, 190, 205, 217, 354, 359, 375, 383, 385, 387, 396

[56] References Cited

U.S. PATENT DOCUMENTS

| | | |
|---|---|---|
| 1,095,858 | 5/1914 | Harrison .................................. 446/120 |
| 2,147,373 | 2/1939 | Laird . |
| 2,236,926 | 4/1941 | Surface . |
| 2,487,654 | 11/1949 | Hoffman et al. . |
| 2,885,822 | 5/1959 | Onanian . |
| 2,959,888 | 11/1960 | Noble ..................................... 446/120 |
| 3,451,158 | 6/1969 | Fischer . |
| 3,469,339 | 9/1969 | Thomas . |
| 3,513,589 | 5/1970 | Fischer . |
| 3,550,311 | 12/1970 | Fouquart ............................... 446/120 X |
| 3,638,352 | 2/1972 | Christiansen . |
| 3,698,123 | 10/1972 | Heldt . |
| 3,838,535 | 10/1974 | Larws . |
| 4,076,429 | 2/1978 | Berkowitz . |
| 4,334,868 | 6/1982 | Levinrad . |
| 4,437,782 | 3/1984 | Geisthoff . |
| 4,548,590 | 10/1985 | Green . |
| 4,764,143 | 8/1988 | Gat et al. . |
| 5,061,219 | 10/1991 | Glickman . |
| 5,137,485 | 8/1992 | Penner ................................. 446/120 X |
| 5,199,919 | 4/1993 | Glickman ............................ 446/120 X |

Primary Examiner—Christopher T. Keut
Attorney, Agent, or Firm—Browdy and Neimark

[57] ABSTRACT

A construction element, preferably a constructional toy, including a tubular body portion and, formed integrally with each of the opposite ends thereof, a pair of gripping jaws, each pair constituting a coupling portion. The constituent jaws of each pair are oppositely disposed with respect to a longitudinal axis of the body portion and are separated by oppositely disposed peripheral coupling device. The tubular body portion is formed with longitudinally directed, angularly spaced-apart, first coupling device. Each pair of the gripping jaws of the construction element can embrace a body portion of a second construction element, with the jaws not extending beyond a median plane of the body portion of the second construction element, and with inner surfaces of the pair of jaws conforming to the outer surface of said body portion. The jaws are formed with second coupling device which can snap-fittingly mate with the first coupling device so as releasably to couple the first and the second construction elements together in a mutually orthogonal position. One pair of jaws of the first construction element being receivable within respective interstices of a pair of jaws of an aligned second construction element with the peripheral and second coupling device which can adapted snap-fittingly mate so as releasably to couple the two aligned elements together. Various complementary construction elements are also described.

20 Claims, 11 Drawing Sheets

CONSTRUCTION ELEMENT

FIELD OF THE INVENTION

The present invention relates to constructional elements, and more particularly to a structural unit for use in the building of structures (both in the field of erecting buildings and in the field of toys), and to a set of constructional elements including such a unit.

BACKGROUND OF THE INVENTION

A variety of construction elements is known, which are comprised of combinations of connector elements and structural elements which can be combined in various configurations to form composite structures.

There are also known many various construction units wherein the same constructional element can serve as both the connector and the structural element.

U.S. Pat. No. 4,548,590 describes a construction element comprising a cylindrical body which has resiliently openable jaws at least at one end thereof. In a construction assembly the jaws are locatable between similar jaws of a further construction element in such a manner that the jaws of the respective elements lie in mutually transverse planes, and that the jaws of each element resiliently engage retention means provided on the other element. The jaws of each element may also be adapted to grip the cylindrical body of the other element or of a cylindrical part of another construction toy.

It should be noted, however, that one cannot build a cross-like structure (which is usually needed for various constructions) using the basic construction element as disclosed and illustrated in the U.S. Pat. No. 4,548,590. The reason for such a limitation is the shape of the body and the corresponding shape of the jaws. In order to grip safely the cylindrical body of a first construction element, a pair of the jaws belonging to a second construction element should embrace the body of the first construction element more than by half of its circumference. It is understood that such an arrangement prevents the jaws of a third construction element from being attached to the first construction element in front of the jaws of the second element and, consequently, the second and the third construction elements cannot be aligned. On the other hand, should the jaws of such a construction element be made shorter, they would become unsuitable for gripping the smooth cylindrical body of another element. As a result of this contradiction, for building a cross-like structure the set of elements described in the U.S. patent is provided with an additional construction element shown in FIG. 10 which constitutes a ready-made cross-like connection.

Another disadvantage of the assembly of the above U.S. Patent is that there is no possibility to connect coaxially a pair of the construction elements in such a manner so that one of the elements will be rotatable about the common axis, and at the same time will be reliably secured to the other element. It may also be added that the elements under discussion are not designed for providing tight fitting reliable connections therebetween, and therefore the assembly is intended rather for the use as a kit of constructional toys, but not as elements for the building purpose.

OBJECT OF THE INVENTION

It is thus an object of the present invention to provide a construction element intended for constructing various structures with tightly fit connections; said element being free from the above mentioned disadvantages.

An additional object of the invention is to provide a set of construction elements including the above-mentioned construction element, serving as a basic one, and at least one type of a complementary element adapted to be used in conjunction therewith.

GENERAL DESCRIPTION OF THE INVENTION

The above object is achieved by the present invention which provides a construction element comprising a tubular body portion and, formed integrally with each of the opposite ends thereof, a pair of gripping jaws, each pair constituting a coupling portion; the constituent jaws of each pair being oppositely disposed with respect to a longitudinal axis of said body portion and being separated by oppositely disposed peripheral coupling means; said tubular body portion being formed with longitudinally directed, angularly spaced-apart, first coupling means; each pair of the gripping jaws being adapted to embrace a body portion of a second construction element with said jaws not extending beyond a median plane of the body portion of said second construction element, and with inner surfaces of said pair of jaws conforming to the outer surface of said body portion and being formed with second coupling means adapted snap-fittingly to mate with said first coupling means so as releasably to couple said construction elements together in a mutually orthogonal position; one pair of jaws of a construction element being receivable within respective interstices of a pair of jaws of an aligned construction element with said peripheral and second coupling means adapted snap-fittingly to mate so as releasably to couple said aligned elements together. Such a construction will be further called a basic construction element.

According to one preferred embodiment of the basic construction element said first coupling means and said peripheral coupling means are shaped as ribs, said second coupling means being manufactured in the form of slots; said ribs and said slots corresponding to each other as mutually engageable male and female components; moreover, said first, second and peripheral coupling means being positioned in mutually orthogonal directions to each other.

According to an alternative embodiment of the basic construction element, said first coupling means and said peripheral coupling means are shaped as slots, said second coupling means being manufactured in the form of ribs; said slots and said ribs corresponding to each other as mutually engageable male and female components. In this embodiment said first, second and peripheral coupling means are also positioned in mutually orthogonal directions to each other.

The basic construction element may have said tubular body portion of a substantially cylindrical shape.

Alternatively, the basic construction element may have the tubular body portion constituting a right prism having a cross-section in the form of a regular polygon with at least four sides; said first coupling means being positioned along longitudinal edges of said prism.

The basic construction element may have the two pairs of gripping jaws arranged symmetrically as follows: the four gripping jaws, forming said coupling portions at the opposite ends of said tubular body portion, lie in two parallel planes.

According to an alternative embodiment the four gripping jaws of the basic construction element may lie in four planes being pairwise mutually transverse.

According to the most preferred embodiment of the basic construction element, its tubular body portion has a cylindrical shape and is provided with first coupling means in the form of eight ribs equally spaced from each other; each of the gripping jaws has on its inner surface one second engaging member in the form of a groove shaped correspondingly to said ribs; the inner surface of said gripping jaw being adapted to embrace substantially a quarter of the outer perimeter of said tubular body portion; said peripheral coupling means being manufactured in the form of ribs similar to said first coupling means. In this embodiment each of said pair of jaws is mounted on a flange perpendicularly extending from one of the opposite ends of the tubular body portion; said flange constituting an integral part of the construction element and having a pair of cut-outs positioned each in front of the peripheral coupling means. The flange is intended to serve as a stopper preventing both mutual rotation of the aligned construction elements when coupled together, and disconnection of the orthogonally connected construction elements due to slippage of one of the elements along the body portion of the other.

According to a further aspect of the invention there is provided a set of construction elements (for example, a set of construction toys) comprising a plurality of the above-described basic construction elements.

An extended set may include the basic construction element, and at least one type of a complementary element adapted to be used in conjunction therewith.

According to one embodiment of the complementary construction element, it comprises a tubular body portion having at one of its ends a pair of integrally formed gripping jaws constituting a coupling portion; the gripping jaws being oppositely disposed with respect to a longitudinal axis of said body portion and being separated by oppositely disposed peripheral coupling means; said pair of gripping jaws being adapted to embrace a body portion of a second construction element with said jaws not extending beyond a median plane of the body portion of said second construction element, and with inner surfaces of said pair of jaws conforming to the outer surface of said body portion and being formed with second coupling means adapted snap-fittingly to mate with said first coupling means of the second construction element so as releasably to couple said construction elements together in a mutually orthogonal position; said pair of jaws of said complementary construction element being receivable within respective interstices of a pair of jaws of an aligned second construction element with said peripheral and second coupling means adapted snap-fittingly to mate so as releasably to couple said two aligned elements together.

It should be mentioned that, the tubular body portion of the above-described complementary element may have a smooth outer surface, contrary to that of the basic construction element, where first coupling means are present.

One of the modifications of the above-described complementary construction element is a connector, comprising the tubular body portion provided at each of its opposite ends with a pair of said gripping jaws; the length of the tubular body of the connector being chosen to be such as to allow the coupling of a pair of the basic construction elements placed parallelly (or perpendicularly) to each other as close as possible. It is understood that, due to rather short length of the tubular body portion, the first coupling means are needless in this embodiment, and therefore they may be absent. The connector, like the basic construction element, may be symmetric or asymmetric, i.e. its four gripping jaws may be manufactured so as to lie in two parallel plates, or in four planes being pairwise mutually transverse.

Consequently, the connector may be used for securing a pair of the basic construction elements in three configurations: coaxially to each other, so that the first element forms continuation of the second; parallelly and in close proximity to each other; orthogonally and in close proximity to each other, thus creating a cross-like configuration not lying in one plane. However, the preferred function of the connector is to provide proximate connections between either parallelly or orthogonally placed basic construction elements; in such combinations the tubular body of the connector is placed perpendicularly to the tubular bodies of the basic construction element.

It should be noted, that a great variety of other complementary construction elements may be designed for use in conjunction with the basic construction element. Since the main condition, which is to be complied with in each one of the complementary elements, is to be somehow engageable with or mating to the basic construction element(s), every one of the complementary construction elements comprises at least one portion which is engageable or mating either to the ribbed tubular body of the basic construction element, or to the pair of jaws thereof.

For example, a complementary construction element is provided, comprising at least one cylindrical ending having on its side surface at least one annularly engaging member adapted snap-fittingly to mate with said second coupling means of the jaws of the basic element; said cylindrical ending being adapted to be inserted and rotatably gripped between the pair of jaws of the aligned basic element by interconnection between said annularly engaging member and the second coupling means.

A further complementary construction element comprises a cylindrical body portion having such a length and a diameter as to enable the pair of jaws of said basic construction element to rotatably accommodate a half of the outer circumference of said cylindrical body portion, when said basic element and the cylindrical body of said complementary construction element are placed in a mutually orthogonal position.

Yet another complementary construction element comprises at least one pair of gripping jaws shaped identically to that of said basic construction element, and being provided with said second and said peripheral coupling means, For example, the pair of gripping jaws may be interconnected (directly or via an intermediate member) with a plate which is adapted to serve as a base plate.

Still further complementary construction element comprises a tubular body portion shaped identically to that of said basic construction element and having said first coupling means.

A number of specific complementary elements will be described in the detailed description of the preferred embodiments.

BRIEF DESCRIPTION OF THE DRAWINGS

The present invention can be best illustrated by the aid of the attached non-limiting drawings, in which:

FIG. 3D illustrates a cross-sectional view similar to that shown in FIG. 3B, the difference being that two construction elements forming the connection have first and peripheral coupling means shaped as slots; second coupling means, which are positioned on the jaws of the elements, are in the form of ribs.

FIG. 3E differs from FIG. 3B by virtue of the shape of the tubular body portion, which is a right prism having an octahedronal cross-section and being provided with ribs on its longitudinal edges.

FIG. 3F is a cross-sectional view of a connection between two construction elements having tubular bodies formed as square prisms, first and peripheral coupling means of these construction elements being slots, and second coupling means being ribs.

DETAILED DESCRIPTION OF THE PREFERRED EMBODIMENTS

Figure 1:
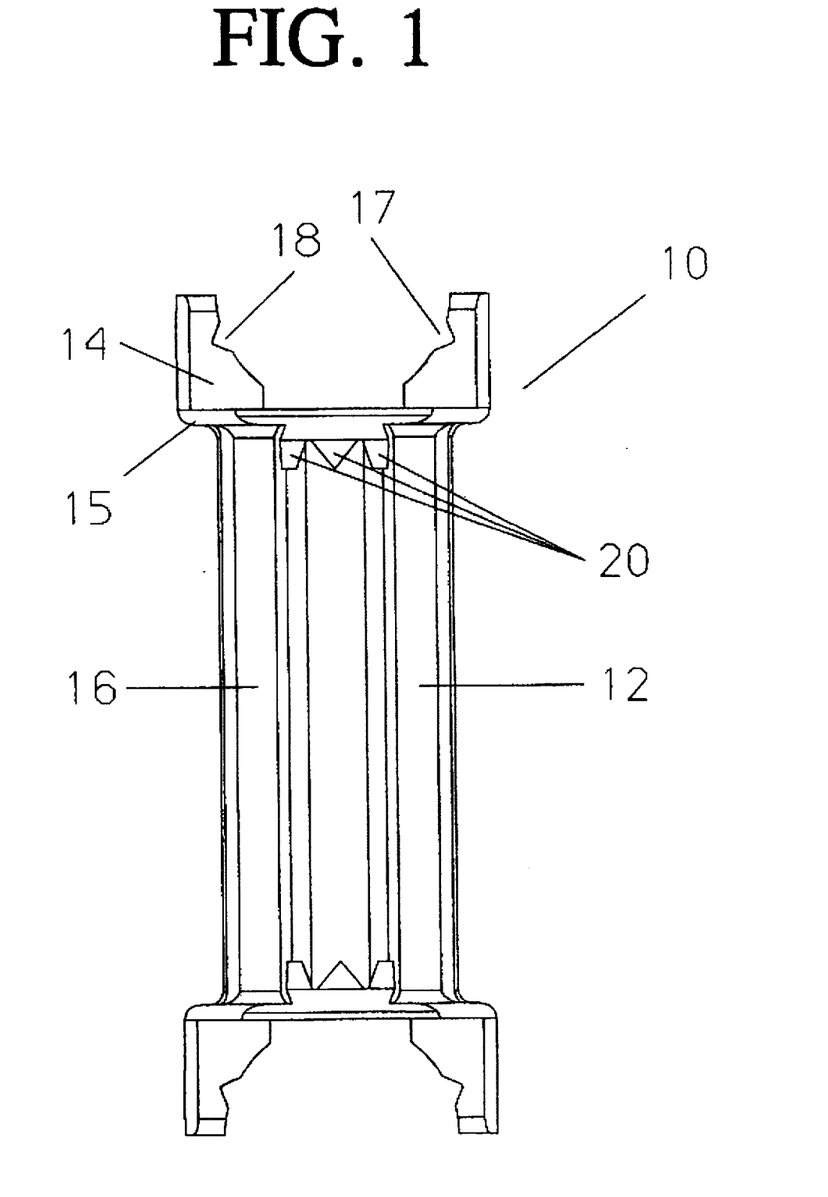
FIG. 1 is a side view of the basic construction element according to the invention.
Figure 2:
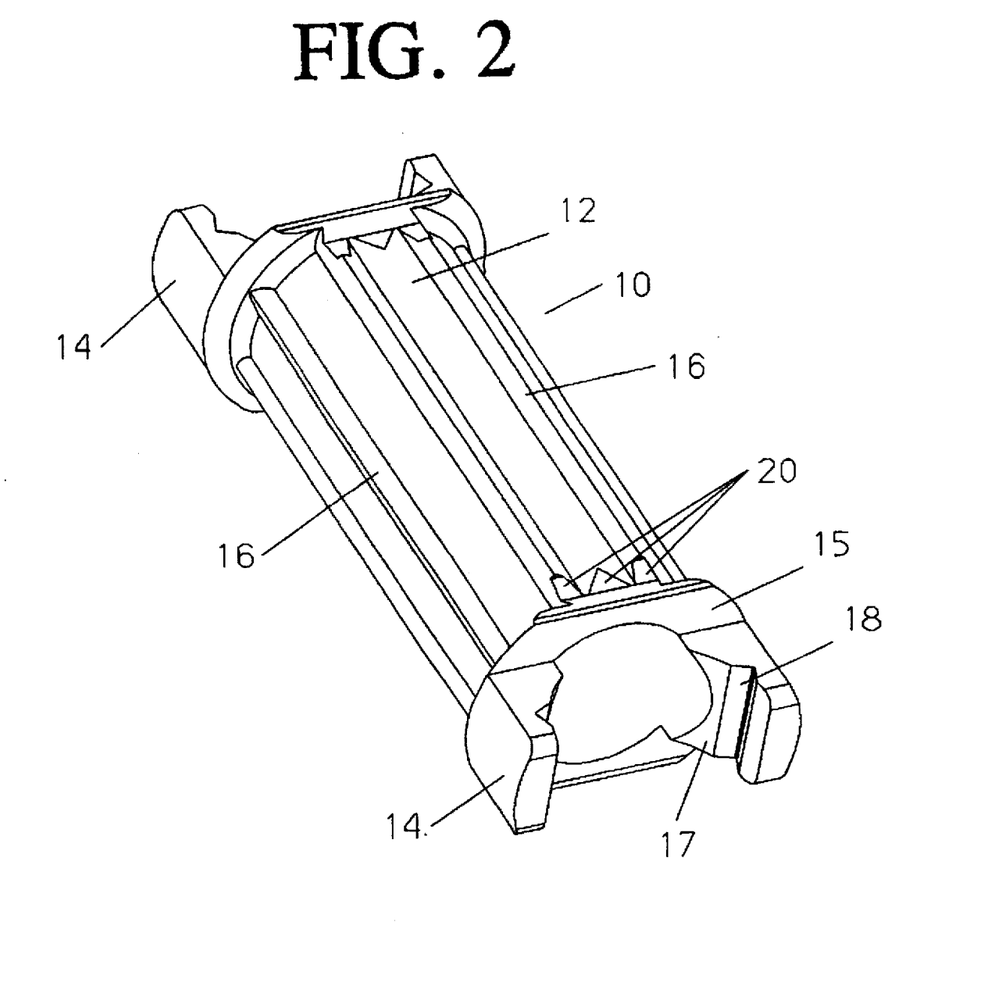
FIG. 2 illustrates a three-dimensional view of the basic construction element shown in FIG. 1.
Figure 3A:
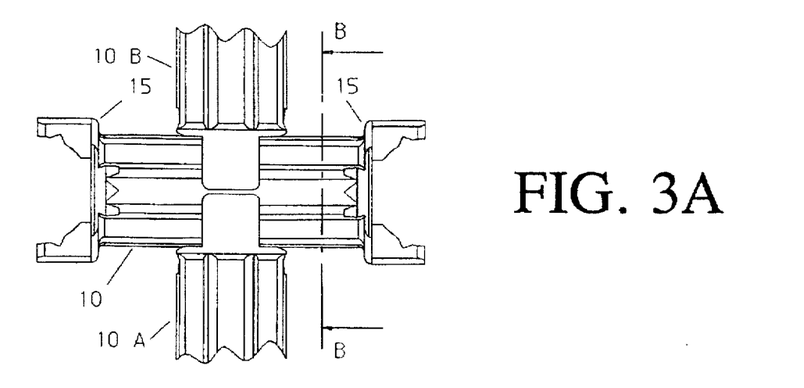
FIG. 3A illustrates a side view of a cross-like connection between three basic construction elements according to the invention.

In FIG. 1 and FIG. 2 there is illustrated a preferred embodiment of a basic construction element 10 which may be manufactured from a plastic material. The element 10 comprises an tubular body portion 12 provided at each of its ends with a pair of diametrically opposite, axially extending gripping jaws 14 mounted on a flange 15. On the side surface of the tubular body 12 there are situated eight longitudinal first coupling means 16 shaped as ribs, which are equally spaced one from another. The inner surface of the tubular body 12 is cylindrical. Each of the jaws 14 has at its inner surface 17 one groove 18 serving as a second coupling means; the direction of the grooves 18 being orthogonal to the direction of the ribs 16 of the tubular body. The inner surfaces 17 of each pair of the jaws 14 conform to the outer surface of the tubular body portion 12, in particular, the grooves 18 mate snap-fittingly with ribs 16 so as releasably to couple two mutually orthogonal basic construction elements in the manner which is illustrated in FIG. 3A.

At each end portion of the tubular body 12 on its side surface there is further provided a pair of peripheral coupling means 20, generally shaped as ribs having the same profile as those marked 16. The ribs 20 are placed in such a manner as to separate the gripping jaws 14, and situated in the direction orthogonal both to the direction of the ribs 16 and to the direction of the slots 18. It is understood that, by means of the ribs 20 and the slots 18 two aligned basic construction elements 10 may be releasably interconnected by inserting the jaws of one element between the jaws of the following one, and snap-fittingly clamping each of the grooves 18 of the coupling four jaws on the corresponding rib 20 (see FIG. 3C).

As has been mentioned above, each pair of the jaws 14 is integrally mounted on the flange 15 situated at the edge of the tubular body 12 and perpendicularly extending therefrom. Each of the flanges 15 has a pair of cut-outs which are positioned in front of the ribs 20. The flanges 15 serve as stoppers both for the vertical (FIG. 3A) and the coaxial type of connection (FIG. 3C) between the basic construction elements.

It should be added, that in an alternative embodiment the first coupling means may be shaped as grooves or slots, and the second coupling means—as ribs.

Figure 3B:
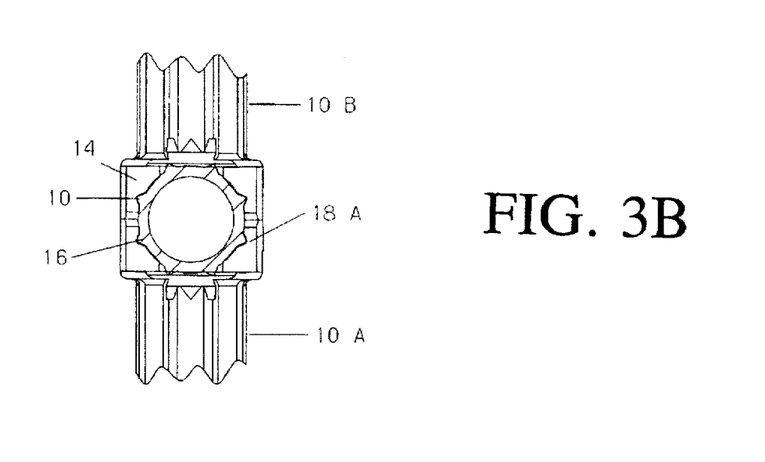
FIG. 3B is a cross-sectional view taken along line B—B of FIG. 3A.

FIGS. 3A and 3B illustrate the cross-like vertical connection between the three basic construction elements 10, 10A and 10B. The pair of gripping jaws of each of the construction elements have such dimensions and shape, as to half-embrace and clampingly grip by their inner surface the tubular body of another vertically placed construction element (see FIG. 3B showing a cross-sectional view taken along line B—B in FIG. 3A). A pair of these construction elements (say, the elements 10A and 10) are vertically secured to each other by interconnection between the pair of the grooves 18A of the jaws belonging to the construction element 10A, and a pair of the ribs 16 belonging to the construction element 10.

As one can see in the drawings 3A and 3B, two construction elements 10A and 10B may be easily connected to the element 10 vertically and in front of each other due to the described shape and dimensions of their jaws, thus forming a cross-like structure. The flange 15 prevents the element 10A (as well as the element 10B) from disconnecting from the element 10, if the former is slid along the latter.

Figure 3C:
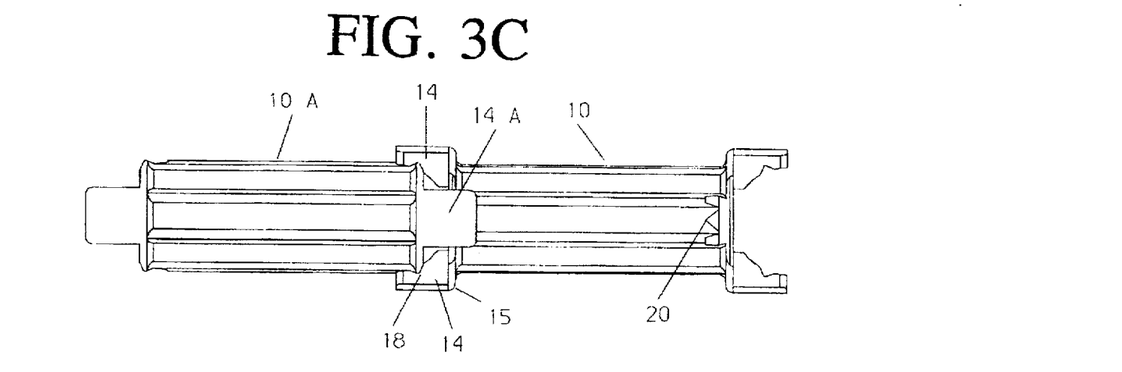
FIG. 3C is a side view of a coaxial connection between a pair of the basic construction elements according to the invention.
Figure 3D:
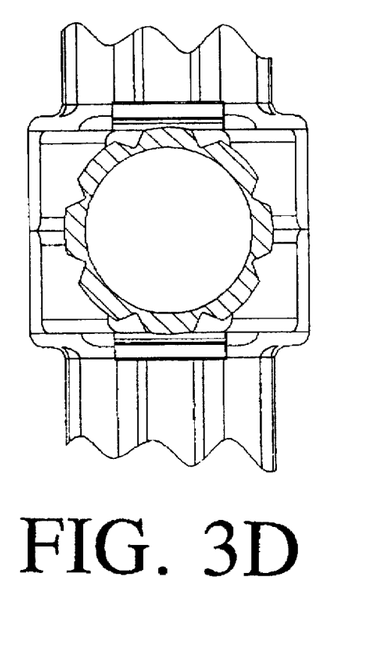
FIGS. 3D, 3E and 3F are cross-sectional views illustrating three other possible shapes of the basic construction element.
Figure 3E:
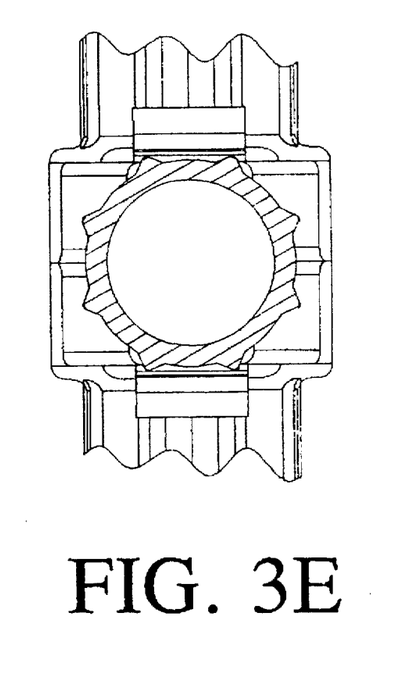
Figure 3F:
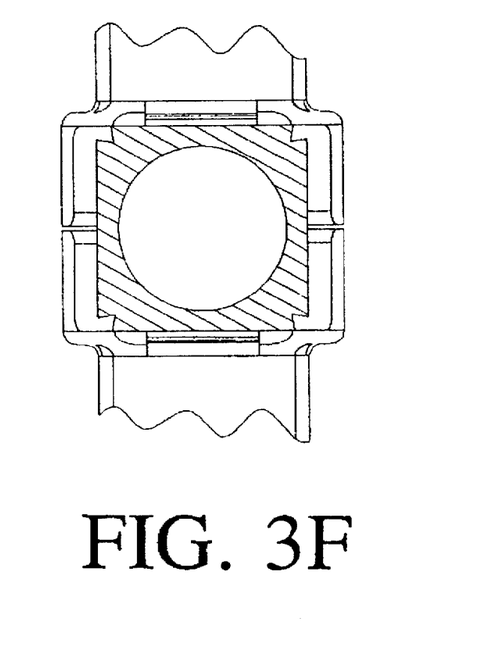

FIG. 3C illustrates a side view of the coaxial type of connection between a pair of the basic construction elements 10 and 10A. The gripping jaws 14 of the construction element 10 are introduced between similar jaws 14A of the adjacent aligned construction element 10A in such a way, that the grooves 18 and 18A of the four jaws respectively interconnect with the four ribs 20 and 20A of the two construction elements, thus releasably coupling them to each other. The flanges 15 and 15A, which are comprised each of a pair of spaced sections divided by two cut-outs, serve as stoppers for preventing mutual rotation of the construction elements 10 and 10A, thus rendering rigidity to the coaxial connection shown in the drawing.

Figure 4A:
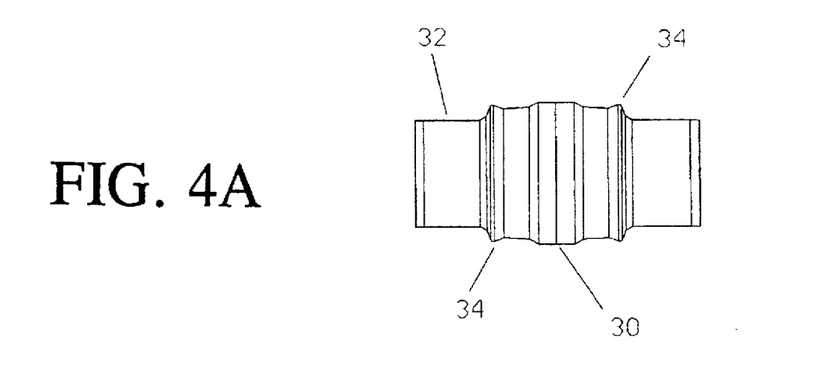
FIGS. 4A, 4B are side views of various modifications of the complementary element according to the invention.
Figure 4B:
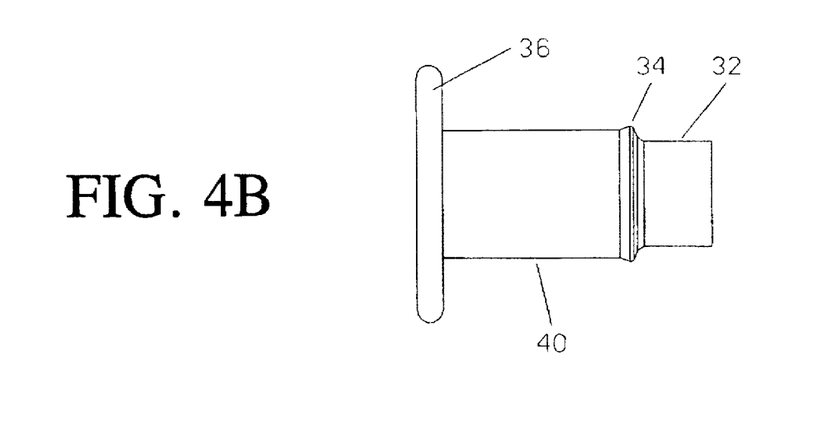

In FIG. 4A and 4B two complementary elements 30 and 40 are illustrated, which can be used in conjunction with the basic elements described above. The complementary element 30 comprises a central body provided with two cylindrical endings 32, and each of them has on its side surface one annularly engaging member 34 in the form of a ring-like protrusion having the profile as that of the ribs 16 and 20 of the basic construction element. Each of the endings 32 of the element 30 can be inserted and releasably gripped between any pair of the gripping jaws 14 of the construction element 10 by interconnection between the annular protrusion 34 and the grooves 18 of the jaws 14. The interconnection being such, that aligned to each other complementary element 30 and construction element 10 are rotatable around their common axis and relative to each other. The diameter of the cylindrical inner surface of the construction element 10 must have the diameter slightly larger than the diameter of the cylindrical ending 32, so as to ensure insertion thereof into the tubular body 12.

FIG. 4B shows another modification of a complementary element 40, which comprises a central body and only one cylindrical ending 32; the second ending is shaped as a wheel 36 (a side elevation thereof is seen).

Figure 5:
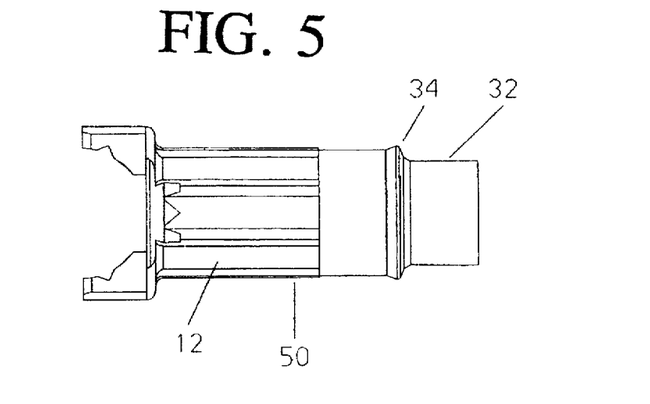
FIG. 5 is a side view of the combined element according to the invention.

FIG. 5 illustrates a combined element 50 constituting a tubular body 12 provided at its first end with a pair of the jaws 14, and at second end with the cylindrical ending 32 having the annular member 34.

Figure 6:
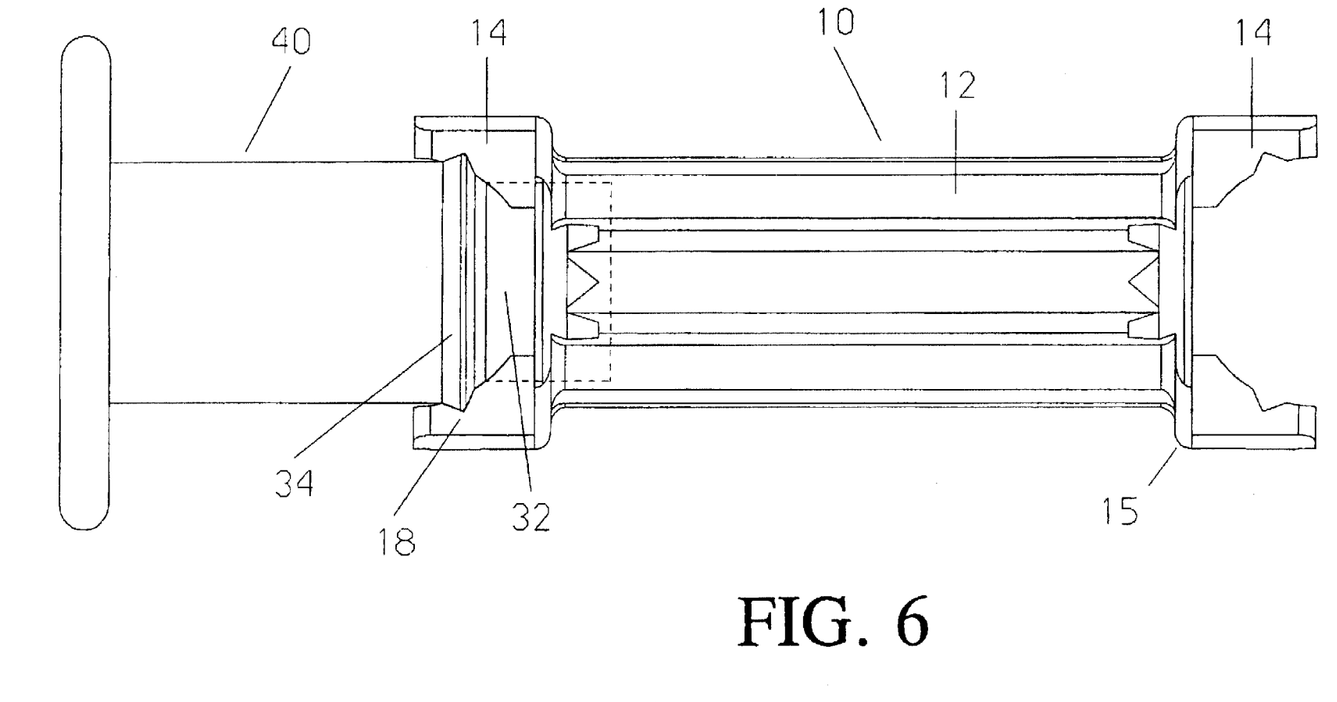
FIG. 6 illustrates a side view of a longitudinal construction built from one basic construction element and one complementary element according to the invention.

In FIG. 6 there is shown a type of interconnection between the basic construction element 10 and the complementary element 40, connected in line to each other. The construction element 10 is aligned and connected to the complementary element 40 such that the grooves of the pair of jaws 14 rotatably interlock with the annular protrusion 34 of the complementary element 40. The cylindrical ending 32 of the complementary element 40 may be partially inserted into the tubular body 12 of the construction element 10. The degree of the insertion depends on the linear dimension of the ending 32.

Figure 7A:
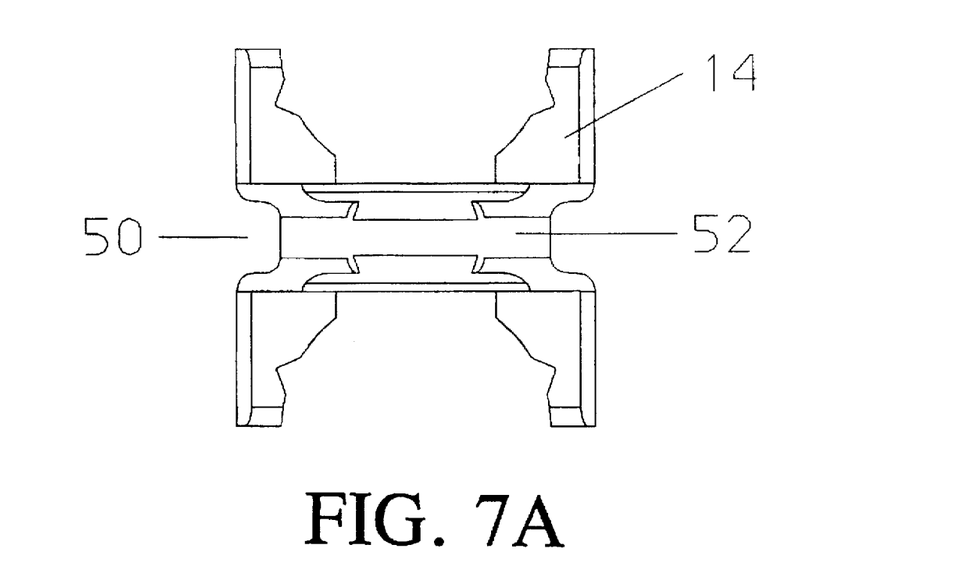
FIGS. 7A and 7B are side views of two types of the short connectors according to the invention.
Figure 7B:
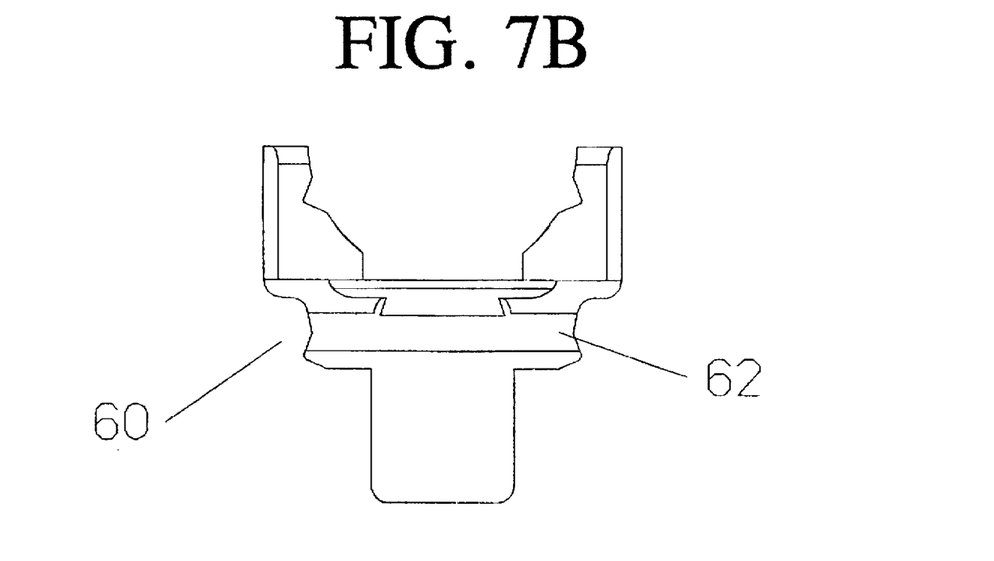

In FIGS. 7A and 7B there are illustrated two modifications of another auxiliary element serving as a connector. These connectors have each a smooth and short tubular body terminating with two pairs of the gripping jaws 14 equal to those described above. One can see that the connector 50 illustrated in FIG. 7A is symmetric, i.e. it has jaws 14 at both ends of its tubular body 52, and the jaws lie pairwise in two parallel planes. The similar connector 60 shown in FIG. 7B is asymmetric, i.e the pairs of the jaws situated at different ends of its tubular body 62 lie in four planes being pairwise mutually transverse. It should be noted that, the basic construction element shown in FIGS. 1 and 2 may, of course, have its jaws arranged in the same manner as the connector 60.

Figure 8A:
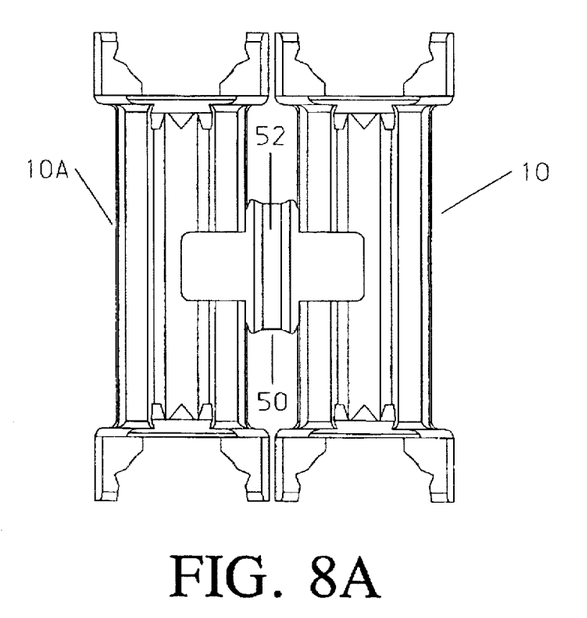
FIGS. 8A and 8B are side views of two types of constructions built using the connectors shown in FIGS. 7A and 7B.

FIG. 8A illustrates how two parallelly placed basic construction elements 10 and 10A can be secured to each other by the aid of the connector 50 shown in FIG. 7A. One can see that the length of the tubular body 52 of the connector is as short as to allow the elements 10 and to be positioned and joined in close proximity to each other.

Figure 8B:
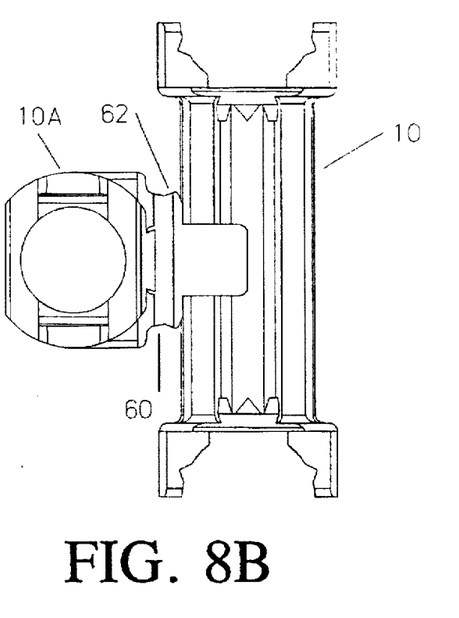

FIG. 8B illustrates an orthogonal configuration formed by two basic construction elements 10, 10A and the connector 60 which is shown in FIG. 7B.

Figure 9A:
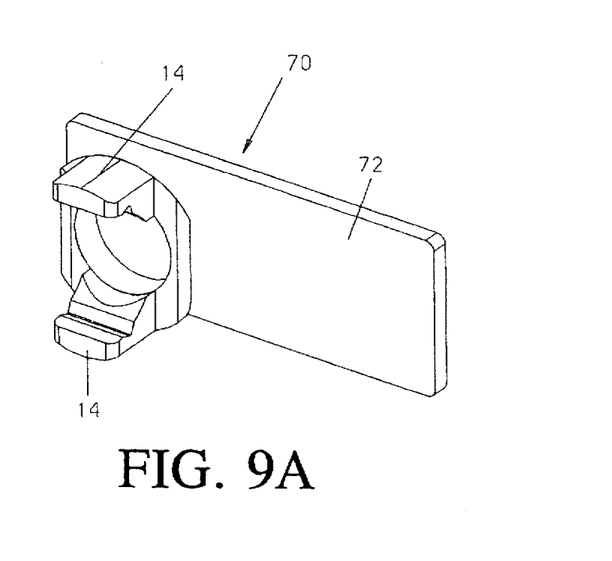
FIGS. 9A, 9B, and 9C are views of yet another complementary construction element.
Figure 9B:
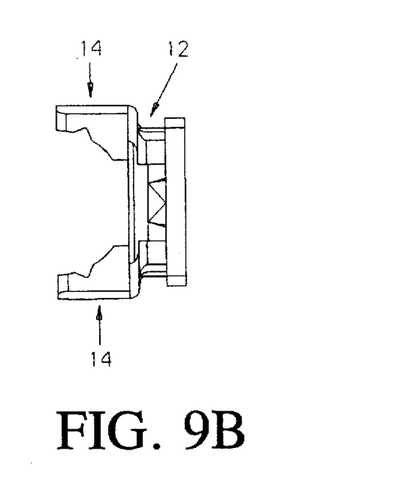
Figure 9C:
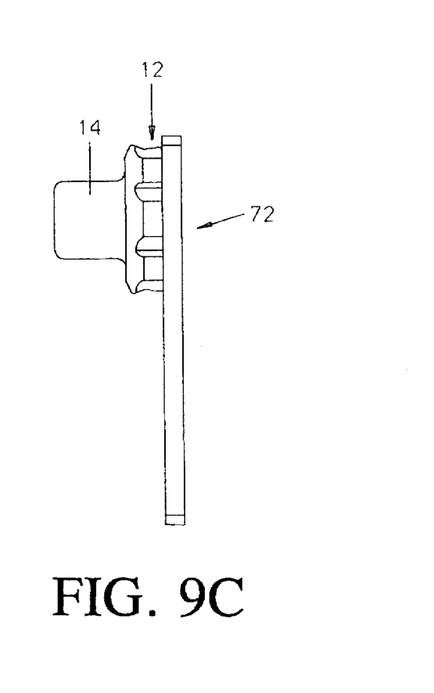

FIGS. 9A, 9B and 9C illustrate another type of a complementary construction element, FIG. 9A is a perspective view of the complementary construction element 70 comprising a pair of jaws 14 mounted on a tubular body portion 12 (not seen), which is secured, in turn, to a plate 72. The plate 72 may serve as a base plate for the whole element 70, and on the jaws 14 thereof one basic or complementary construction element may be mounted. The tubular body portion 12 can be seen in FIGS. 9B and 9C which are two different side views of the element 70. It should be appreciated that the portion 12 may be either ribbed or smooth, and may be connected to the base plate either vertically, or not.

Figure 10A:
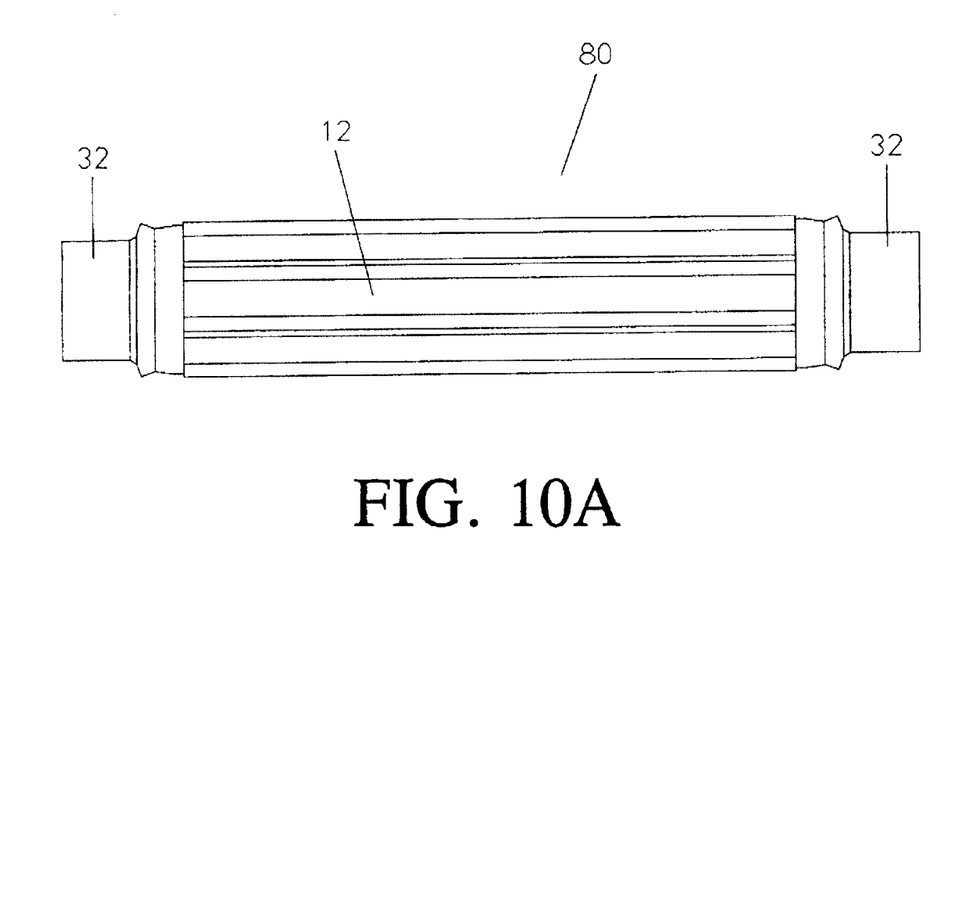
FIGS. 10A and 10B are a side and a front views of still further complementary construction element.
Figure 10B:
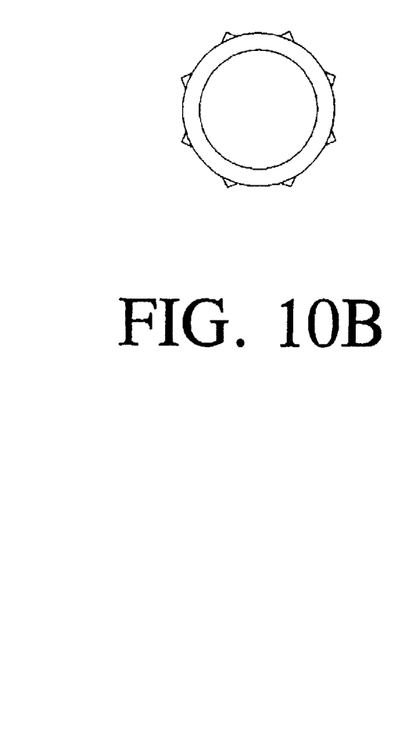

FIGS. 10A and 10B illustrate a side view and a front view of yet another complementary construction element 80 similar to that shown in FIG. 5, but comprising two cylindrical endings 32 provided, respectively, at both ends of the tubular ribbed body 12. In principle, the tubular body may be manufactured without the longitudinal ribs, i.e. without the first coupling means.

Figure 11A:
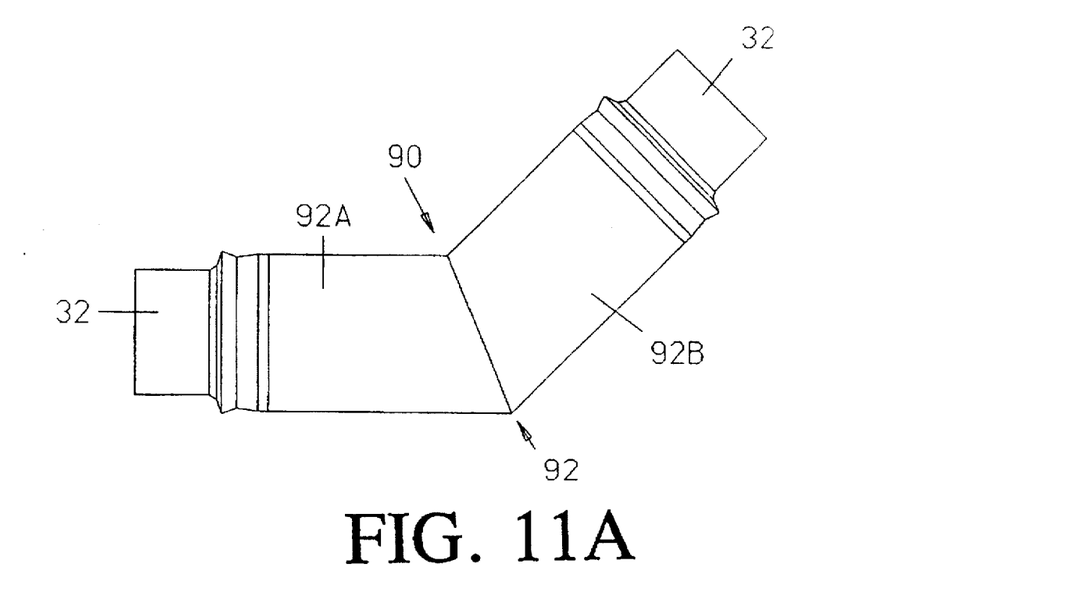
FIGS. 11A and 11B are side views of two modifications of still another complementary construction element.

FIG. 11A shows still a further complementary element 80 which comprises a smooth tubular body 92 consisting of two interconnected tubular portions 92A and 92B forming an obtuse angle between them, the body at each of its two ends is provided with the cylindrical ending 32.

Figure 11B:
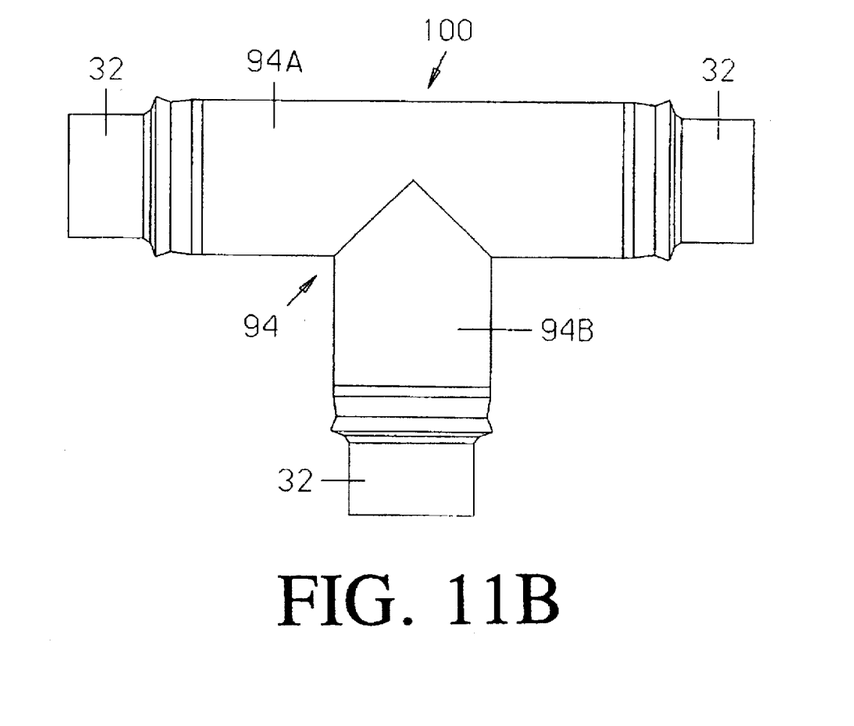

FIG. 11B illustrates another modification 100 of the complementary element shown in FIG. 11A. Two smooth tubular body portions 94A and 94B are interconnected so, as to form a T-shaped tubular body 94. The three ends of the T-shaped body 94 terminate with three cylindrical endings 32, respectively. A diameter of the tubular body portions 92A, 92B, 94A and 94B is preferably such, that said tubular body portion can be half-embraced by and rotatably accommodated between the pair of jaws of the basic construction element placed in a mutually orthogonal position to said tubular body portion. One should appreciate, that the embodiments illustrated in FIGS. 11A and 11B, instead of the smooth body portions, may optionally comprise ones with the longitudinal ribs forming the first coupling means. Each of these embodiments may also comprise both smooth and ribbed tubular body portions in combination.

Since all the elements described above can be interconnected with each other, they may form a set, serving, for example, as a kit of construction toys.

What is claimed is:

1. A construction element comprising a tubular body portion and, formed integrally with each of opposite ends thereof, a pair of gripping jaws, each pair constituting a coupling portion; constituent jaws of each pair being oppositely disposed with respect to a longitudinal axis of said body portion and being separated by oppositely disposed peripheral coupling means; said tubular body portion being formed with longitudinally directed, angularly spaced apart, first coupling means; each pair of the gripping jaws being adapted to embrace a body portion of a second construction element with said jaws not extending beyond a median plane of the body portion of said second construction element, and with inner surfaces of said pair of jaws conforming to the outer surface of said body portion and being formed with second coupling means adapted snap-fittingly to mate with said first coupling means so as releasably to couple said construction elements together in a mutually orthogonal position; one pair of jaws of a construction element being receivable within respective interstices of a pair of jaws of an aligned construction element with said peripheral and second coupling means adapted snap-fittingly to male so as releasably to couple said aligned elements together.

2. A construction element according to claim 1, wherein said first coupling means and said peripheral coupling means are shaped as ribs, said second coupling means being manufactured in the form of slots; said ribs and said slots corresponding to each other as mutually engageable male and female components; said first, second and peripheral coupling means being positioned in mutually orthogonal directions to each other.

3. A construction element according to claim 1, wherein said first coupling means and said peripheral coupling means are shaped as slots, said second coupling means being manufactured in the form of ribs; said slots and said ribs corresponding to each other as mutually engageable male and female components; said first, second and peripheral coupling means being positioned in mutually orthogonal direction to each other.

4. A construction element according to claim 1, wherein said tubular body portion has a substantially cylindrical shape.

5. A construction element according to claim 1, wherein the tubular body portion constitutes a right prism having a cross-section in the form of a regular polygon with at least four sides, said first coupling means being positioned along longitudinal edges of said prism.

6. A construction element according to claim 1, wherein the four gripping jaws forming two said coupling portions at the opposite ends of said tubular body portion, lie in two parallel planes.

7. A construction element according to claim 1, wherein the four gripping jaws, forming two said coupling portions at the opposite ends of said tubular body portion, lie in four planes being pairwise mutually transverse.

8. A construction element according to claim 1, wherein the tubular body portion has a cylindrical shape and is provided with first coupling means in the form of eight ribs equally spaced from each other; each of the gripping jaws has an inner surface with one second engaging member in the form of a groove shaped correspondingly to said ribs; an inner surface of said gripping jaw being adapted to embrace substantially a quarter of an outer perimeter of said tubular body portion; said peripheral coupling means being manufactured in the form of ribs similar to said first coupling means.

9. A construction element according to claim 1, wherein each of said pair of jaws is mounted on a flange perpendicularly extending from one of the opposite ends of the tubular body portion; said flange constituting an integral part of the construction element and having a pair of cut-outs positioned each in front of the peripheral coupling means; said flange serving as a stopper preventing both mutual rotation of the aligned construction elements coupled together, and disconnection of the orthogonally connected said construction elements due to slippage of one of the elements along the body portion of another.

10. A set comprising a plurality of the construction elements according to claim 1.

11. A set including the construction element according to claim 1 and at least one complementary construction element adapted to be used in conjunction therewith.

12. A set according to claim 11, wherein said complementary construction element comprises a tubular body portion having at one of its ends a pair of integrally formed gripping jaws constituting a coupling portion; the gripping jaws being oppositely disposed with respect to a longitudinal axis of said body portion and being separated by oppositely disposed peripheral coupling means; said pair of the gripping jaws being adapted to embrace a body portion of a second construction element with said jaws not extending beyond a median plane of the body portion of said second construction element, and with inner surfaces of said pair of jaws conforming to the outer surface of said body portion and being formed with second coupling means adapted snap-fittingly to mate with said first coupling means of the second construction element so as releasably to couple said construction elements together in a mutually orthogonal position; said pair of jaws of said complementary construction element being receivable within respective interstices of a pair of jaws of an aligned second construction element with said peripheral and second coupling means adapted snap-fittingly to mate so as releasably to couple said two aligned elements together.

13. A set according to claim 12, wherein said complementary construction element serves as a connector; the tubular body portion of said connector being provided at the opposite end with a second pair of said gripping jaws; said tubular body having such a length as to enable said connector to couple by said two pairs of jaws a pair of said construction elements placed parallelly in close proximity to each other.

14. A set according to claim 13, wherein the four gripping jaws of the connector lie in two parallel planes.

15. A set according to claim 12, wherein said complementary construction element serves as a connector; the tubular body portion of said connector being provided at the opposite end with a second pair of said gripping jaws; said tubular body having such a length as to enable said connector to couple by said two pairs of jaws the tubular bodies of a pair of said construction elements placed in close proximity to each other; the four gripping jaws of the connector lie in four planes being pairwise mutually transverse.

16. A set according to claim 11, wherein said complementary construction element comprises at least one cylindrical ending having a side surface with at least one annularly engaging member adapted snap-fittingly to mate with said second coupling means of the jaws of said construction element; said cylindrical ending being adapted to be inserted and rotatably gripped between the pair of jaws of an aligned said construction element by interconnection between said annularly engaging member and the second coupling means.

17. A set according to claim 11, wherein said complementary construction element comprises a cylindrical body portion having such a length and a diameter as to enable said pair of jaws of the construction element to rotatably accommodate a half of an outer circumference of said cylindrical body portion, when said construction element and the tubular body of said complementary construction element are placed in a mutually orthogonal position.

18. A set according to claim 11, wherein said complementary construction element comprises at least one pair of gripping jaws shaped identically to that of said construction element, and being provided with said second and said peripheral coupling means.

19. A set according to claim 18, wherein said complementary construction element comprises a plate being perpendicular to the planes of said pair of gripping jaws and adapted to serve as a base plate.

20. A set according to claim 11, wherein said complementary construction element comprises a tubular body portion shaped identically to that of said construction element and having said first coupling means.

* * * * *